DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1148

T878,017

COUPLED SPINNING AND DRAWING PROCESS FOR PRODUCTION OF POLYCARBOXAMIDE FILAMENTS

John J. Shwed, 105 Lake Drive, Laurel, Del. 19956, and Elwood A. Roth, 200 North Porter St., and Armando Rodriquez, 194A Rte. 2, both of Seaford, Del. 19973

Filed Jan. 27, 1970, Ser. No. 6,283
Int. Cl. D01d *5/12;* D01f *7/06*
U.S. Cl. 264—210
No Drawing. 4 Pages Specification

A coupled, spinning and drawing process for the production of filamentary yarn from polycarbonamides. After spinning filaments and quenching them to a temperature of about 110–130° C., an aqueous finish is applied and a supplemental quench to a temperature of less than about 75° C. by evaporative cooling is achieved before drawing by delaying advance of the yarn through ambient air to a draw zone. The elapsed time between finish application and take-off from the feed roll to the draw zone is on the order of one second or less.